United States Patent [19]

Sharpless

[11] 4,011,558
[45] Mar. 8, 1977

[54] DC GAS PANEL ELECTRICAL DISPLAY DEVICE

[75] Inventor: Graham Trevor Sharpless, Hassocks, England

[73] Assignee: U.S. Philips Corporation, New York, N.Y.

[22] Filed: Oct. 22, 1974

[21] Appl. No.: 516,985

[30] Foreign Application Priority Data

Oct. 22, 1973 United Kingdom ............ 49016/73

[52] U.S. Cl. .................... 340/324 M; 315/169 TV; 340/343
[51] Int. Cl.² .......................................... G06F 3/14
[58] Field of Search .......... 340/324 R, 324 M, 343; 315/169 TV, 169 R

[56] References Cited

UNITED STATES PATENTS

| | | | |
|---|---|---|---|
| 3,395,268 | 7/1968 | Barton | 340/324 R |
| 3,719,940 | 3/1973 | Lay et al. | 340/324 M |
| 3,750,159 | 7/1973 | Wojcik | 340/324 M |
| 3,824,580 | 7/1974 | Bringol | 340/324 M |

Primary Examiner—Marshall M. Curtis
Attorney, Agent, or Firm—Frank R. Trifari; Robert S. Smith

[57] ABSTRACT

An electrical display device which is adapted for operation in the storage mode wherein the addressing circuit arrangement of the device is arranged to effect block write/random erase addressing and includes a first sub-matrix of erase driver circuits for supplying erase pulses to column conductors, each of said sub-matrices comprising in respect of each conductor to be energized of the appertaining conductor group (row or column) a cross-point output formed by the interconnection of two unique co-ordinate erase driver circuit outputs. Each cross-point output includes a pair of diodes through which the two erase driver circuit outputs are connected respectively to form the cross-point output.

6 Claims, 6 Drawing Figures

DC GAS PANEL ELECTRICAL DISPLAY DEVICE

This invention relates to electrical display devices of the kind comprising a two-dimensional matrix of light-emitting elements, for example glow discharge cells or light-emitting diodes, which are connected at respective cross-points formed by two groups of co-ordinate conductors and each of which can be illuminated selectively by suitable energising signals applied contemporaneously to the two conductors, one in each group, between which the element is connected, by an addressing circuit arrangement of the device.

Two-dimensional matrices of glow discharge cells for electrical display devices of the above kind are described in U.K. Patent Specifications Nos. 1,153,673, 1,153,674 and 1,244,306. The two-dimensional matrix described in U.K Patent Specification No. 1,244,306 is small 5×7 cell matrix of glow discharge cells and is suitable for displaying one alpha-numeric character. A plurality of similar small cell matrices can be used to form a composite panel of larger size suitable for displaying a relatively large number of alpha-numeric characters simultaneously. A typical large size panel may comprise a 200 (row) × 200 (column) two-dimensional matrix of glow discharge cells. Assuming that each character region of this larger size panel comprises 6×8 = 48 cells, of which 5×7 = 35 are active cells for character formation and the remaining cells of each character region provide guard bands for spacing apart adjacent characters and adjacent lines of characters, then 25 lines of 33 alpha-numeric characters (825 characters in all) can be displayed on the panel simultaneously.

The words "row" and "column" are used, and will be so used hereinafter, solely to distinquish between the co-ordinate lines of light-emitting elements which form the two-dimensional matrix of an electrical display device of the kind referred to. Thus, either of the two groups of co-ordinate lines of elements can be termed "row" elements with the elements of the other groups being termed "column" elements. The two groups of co-ordinate conductors which form the cross-points will be referred to, correspondingly, as "row" conductors and "column" conductors.

An electrical display device of the kind referred to can be adapted for operation in a so-called "storage mode", by which adaptation is meant that the light-emitting elements chosen for the matrix have a bistable characteristic such that they an be held illuminated, following energisation, by a lesser voltage potential than that required for their initial energisation, and an individual current limiting resistance is connected in series with each light-emitting element of the matrix. Glow discharge cells have a bistable characteristic which is suitable for this storage mode of operation. Semiconductors GaAs diodes for infra-red displays and semiconductor GaAsP diodes for visible red light displays can also have a bistable characteristic which is suitable for this storage mode of operation, but for the sake of convenience the invention will be described with reference to glow discharge cells.

In this "storage mode" of operation, the glow discharge of individual cells can be switched on and off selectively, using so-called "random write/random erase" addressing in which suitable voltage pulses are applied to the appropriate row and column conductors to which the cells are connected as a cross bar matrix with their anodes and cathodes forming X and Y axes, respectively. Hereinafter, the voltage pulses for switching on the cells will be referred to as write pulses (Vw), and those for switching off the cells will be referred to as erase pulses (Ve). A cell which has been switched on can be maintained "on" after the termination of the write pulses (Vw) by applying across the series connection of the cell and its limiting resistance a bias voltage (Vb) which is greater than the maintain voltage (Vm) of the cell, but less than the strike voltage (Vs) which is required to ignite the glow discharge of the cell (i.e. switch on the cell).

The amplitude of each of the write pulses (Vw) and of the bias voltage (Vb) can be chosen as shown in FIG. 1 of the accompanying drawings. One write pulse on either cross bar in conjunction with the bias voltage must not be sufficient to ignite any cell of the matrix, whereas two coincident write pulses, one on each cross bar, in conjunction with the bias voltage must exceed the strike voltage of any appropriate cell. When considering a practical matrix, the tolerances on write pulse amplitude and bias voltage amplitude must take into account the following inequalities due to maximum and minimum values of strike and maintain voltages.

$$Vb + Vw < Vs \text{ (min)} \qquad \text{i.}$$

$$Vb + Vw > Vs \text{ (max)}$$

Hence, $Vw > [Vs \text{ (max)} - Vs \text{ (min)}]$, i.e., each write pulse must exceed the spread in the strike voltages of the matrix.

From (i) $Vb < Vs \text{ (min)} - Vw$ i.e.
$$Vb < Vs \text{ (min)} - [Vs \text{ (max)} - Vs \text{ (min)}] \qquad \text{ii.}$$

The erase conditions are similar in that two coincident erase pulses (Ve) are used to reduce the voltage across a selected discharge cell to a value below the maintain voltage. The bias voltage must therefore be sufficiently large for a single erase pulse not to extinguish any cell.

For erase:

$$Vb - Ve > Vm(\text{max}) \qquad \text{iii.}$$
$$Vb - 2Ve < Vm(\text{min})$$

Hence: $Ve > [Vm(\text{max}) - Vm \text{ (min)}]$ i.e. each erase pulse must exceed the spread in the maintain voltages of the matrix.

From (iii) $Vb > Vm(\text{max}) + Ve$
Hence:

$$Vb > Vm(\text{max}) + [Vm(\text{max}) - Vm(\text{min})] \qquad \text{iv.}$$

From (ii) and (iv):

$$Vs(\text{min}) - Vm(\text{max}) > [Vs(\text{max}) - Vs(\text{min})] + [Vm(\text{max}) - Vm(\text{min})].$$

The "gap" between $Vs(\text{min})$ and $Vm(\text{max})$ must therefore exceed the sum of the strike and maintain voltage spreads. This is a stringent condition for a large glow discharge cell matrix to meet. This problem is alleviated by the invention of our U.K. Patent No. 1,313,762 (PHB 32010) which is an electrical display device of the kind referred to in which during "random write/random erase" addressing the bias voltage is switched between a maximum value for erasing cells and a minimum value for writing. By means of this "switched-bias" mode of operation conditions (ii) and (iv) are satisfied separately and not simultaneously, so that the conditions to be met become:

For writing, $$Vs(min) - Vm(max) > [Vs(max) - Vs(min)] \qquad \text{v.}$$

i.e., the gap between $Vs(min)$ and $Vm(max)$ need now be greater than $Vs$ spread only.

For erasing, $$Vs(min) - Vm(max) > [Vm(max) - Vm(min)] \qquad \text{vi.}$$

i.e., the gap need now be greater than $Vm$ spread only.

However, condition (v) is more stringent than condition (vi) for most types of glow discharge cell panel, because, in general, $Vm$ spread is considerably less than $Vs$ spread. Therefore, it is attractive to consider as an alternative so-called block write/random erase addressing in which one or more rows of cells are ignited as one block and unwanted cells then selectively erased, because for this alternative only condition (vi) has to be satisfied. As shown in FIG. 2 of the accompanying drawings a single write pulse ($Vw'$) on either cross bar, in conjucntion with the bias voltage $Vb$, can then be used to ignite a row or a number of rows of cells, with the erase conditions being the same as before in that two coincident erase pulse ($Ve$) are used to reduce the voltage across a selected cell to a value below the maintain voltage, and that the bias voltage must be sufficiently large for a single erase pulse not to extinguish any cell.

The present invention provides an electrical display device of the kind referred to which is adapted for operation (as hereinbefore defined) in the storage mode wherein the addressing circuit arrangement of the device is arranged to effect block write/random erase addressing and includes a first sub-matrix of erase driver circuits for supplying erase pulses to the row conductors and a second sub-matrix of erase driver circuits for supplying erase pulses to the column conductors, each of said sub-matrices comprising in respect of each conductor to be energised of the appertaining conductor group (row or column) a cross-point output formed by the interconnection of two unique co-ordinate erase driver circuit outputs, each cross-point output including a pair of diodes through which the two erase driver circuit outputs are connected respectively to form the cross-point output, which diodes are poled so as to isolate operationally each cross-point output from the other cross-point outputs of the same sub-matrix whilst permitting the application of the appropriate erase and bias voltage amplitudes across the elements of the matrix.

With regard to the write pulses which are required for the block write addressing, it is preferred to include in one of the sub-matrices a single group of write driver circuits which have their outputs paralleled with the outputs of one array of group driver circuits of the matrix at the cross-point outputs thereof.

In further considering the invention and in describing a particular embodiment thereof, reference will now be made by way of example to the accompanying drawings, of which:

Figure 1:
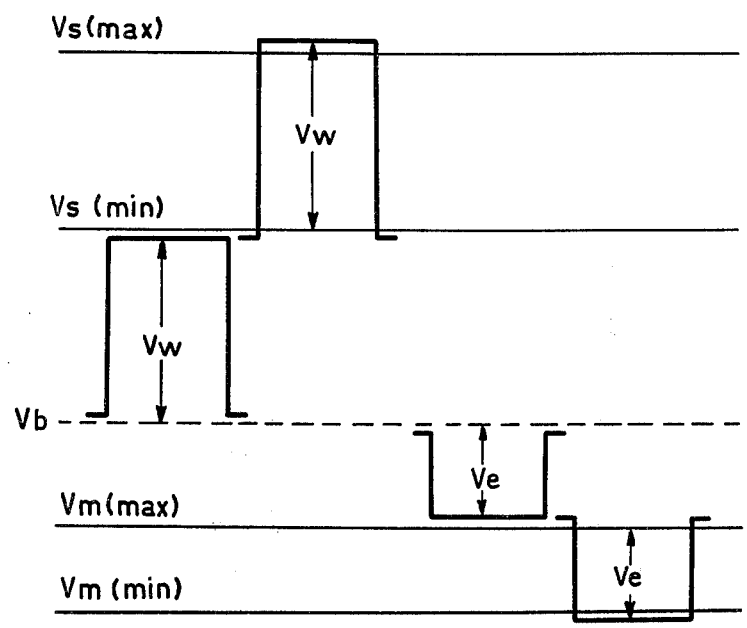
FIG. 1 shows, as aforesaid, voltage requirements for random write/random erase addressing of a glow discharge cell panel.
Figure 2:
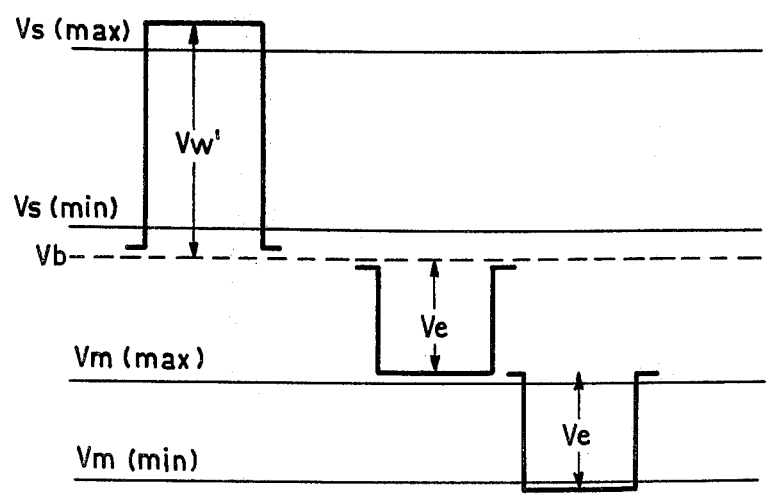
FIG. 2 shows, as aforesaid, voltage requirements for block write/random erase addressing of a glow discharge cell panel.
Figure 3:
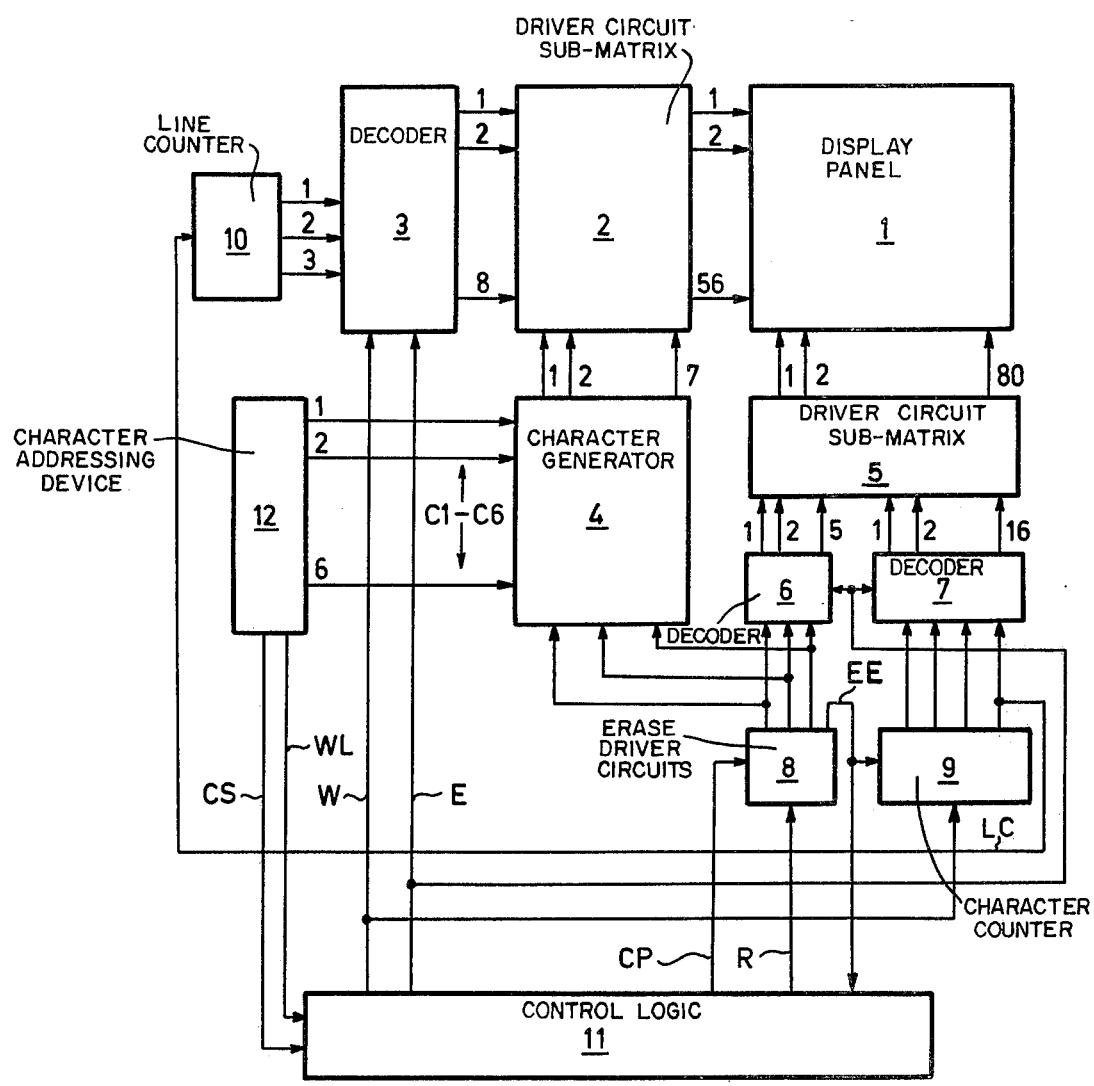
FIG. 3 shows a schematic diagram of an electrical display device according to the invention.

Referring to FIG. 3, the device there shown includes a display panel 1. This panel 1 is assumed to be a panel of gas discharge cells on which can be displayed a total of 128 characters arranged in eight lines of 16 characters, using a standard 5×7 cell format for each character and allowing one cell column spacing between characters and two cell rows between lines of characters.

The panel 1 can consist essentially of two moulded glass metal components, namely a planar body comprising a recessed cathode array and a window to which strip anodes are attached and are taken out through glass-to-metal seals at the ends of the panels. One cathode strip is common to each (horizontal) row. Each (vertical) column of anodes consists of one strip of metal passing through the body of the panel. Any cell in the panel can be ignited by applying a suitable voltage across the anode and cathode cross-bars that intersect at the cell. The cell can thereafter be held "on" by maintaining across it a lesser bias voltage. A resistance is connected in series with each cell to limit the discharge current. Such resistances can be formed integrally in the panel structure.

The addressing circuit arrangement for the panel 1 comprises a first driver circuit sub-matrix 2 for addressing the row conductors (cathode cross-bars) of the panel 1 with both write and erase pulses. This sub-matrix 2, which will be described in more detail later, comprises a first group of eight erase driver circuits which are fed by a decoder 3, a second group of 7 erase driver circuits which are fed by a character generator 4, and a group of write driver circuits which are also fed by the decoder 3. The first and second groups of erase driver circuits are arranged in an 8×7 matrix to provide 56 cross-point outputs, one for each active cell row of the panel 1. The circuits of the group of eight write driver circuits are "paralleled" at the cross-point outputs with respective circuits of the first group of eight erase driver circuits, each write driver circuit pertaining to a different line of characters and thus being common to seven cell rows of the cell matrix.

The column conductors (anode cross-bars) for the 80 active cell columns of the panel 1 are addressed with erase pulses by a second driver circuit sub-matrix 5. This sub-matrix 5, which will also be described in more detail later, comprises a third group of five erase driver circuits which are fed by a decoder 6 and a fourth group of 16 erase driver circuits which are fed by a decoder 7. These third and fourth groups of erase driver circuits are arranged in a 5×16 matrix to provide 80 cross-point outputs, one for each active cell column of the panel 1.

The addressing circuit arrangement further includes a column counter 8, a character counter 9, a line counter 10, control logic 11 and a character addressing device 12, such as a keyboard. The counters 8, 9 and 10, which are binary counters, are organised having regard to the 5×7 character format, the number (16) of characters per line and the number (eight) lines of characters. Thus, the column counter 8, which is driven by clock pulses CP from the control logic 11, provides a recurrent count of five as a 3-bit word output to the decoder 6, the character counter 9, which is driven once per cycle of the counter 8, provides a recurrent count of 16 as a 4-bit word output to the decoder 7, and the line counter 10, which is driven once per cycle of the counter 9, provides a recurrent count of 8 as a 3-bit word output to the decoder 3. The character generator 4 contains the dot formats of each possible character to be displayed. Each of 64 different character formats is selectable by the device 12 by means of a 6-bit word, per character, which is applied to character generator 4 over leads C1 to C6. The character generator 4 applies to the sub-matrix 2 a 7-bit parallel output which in respect of each character selected is repeated five times under the control of the counter 8, with the five 7-bit outputs for a character representing, respectively, the character dots and spaces, in the seven row positions of the five columns of the character format.

When characters are to be written on the panel 1 for display, the device 12 applies a "write line" signal to the control logic 11 over a lead WL. In response to this signal the control logic 11 produces on a lead W a "write" signal which is applied to the decoder 3 which is responsive thereto and to the line 1 count of the line counter 10 to cause the first write driver circuit to produce a write pulse to ignite all cells in all of the 7 cell rows that pertain to the first line of characters. The signal on lead W is also used to reset the character counter 9, so that the decoder 7, is prepared for causing the sub-matrix 5 to address the 5 cell columns of the first character position of the several lines of characters. The control logic 11 then replaces the "write" signal on lead W by an "erase" signal on a lead E, which "erase" signal enables the decoders 3, 6 and 7. When the device 12 has applied a 6-bit character word via leads C1 to C6 to the character generator 4, the device 12 applies over a lead CS a "character strobe" signal to the control logic 11 which is responsive to this signal to reset the column counter 8 by a "reset" signal applied over lead R, and to produce the clock pulses on the lead CP. The decoder 6 is responsive to the count-of-five output from the column counter 8 to cause, in conjunction with the decoder 7, the sub-matrix 5 to address in turn with an erase pulse each of the 5 cell columns of the first character positions of the several lines of characters. At the same time, the character generator 4 is responsive to the count-of-five output from the column counter 8 to cause, in conjunction with the decoder 3, the sub-matrix 5 to address five times with erase pulses the seven cell rows of the first line of characters, this latter addressing being each time with a combination of erase pulses as determined by the changing 7-bit parallel output from the character generator 4. As a result of this double matrix addressing, selected cells in the first character position are extinguished column-by-column, leaving ignited only those cells which form a character in that position.

The column counter 8 has an end-to-count position from which it produces on a lead EC a signal that steps on the character counter 9 one step for addressing the next character position, whilst inhibiting temporarily the clock pulses from the control logic 11. The 6-bit character word into the character generator 4 is now changed to identify the next character to be written and displayed, and the column counter 8 is then reset to repeat its count-of-five for addressing the cell columns of the next character position. This operation thereafter continues until the whole of the first line of characters has been displayed by selective erasure of the unwanted cells. Once the last character of the line has been dealt with, the last (16th) output from the character counter 9 is applied over a lead LC to step-on the line counter 10 one step in readiness for dealing with the second line of characters in the same way as the first line, namely by igniting all of the cells in all of the seven cells rows that pertain to the second line of characters, and then selectively entinguishing unwanted cells column-by-column. The remaining lines of characters are thereafter built-up in similar fashion until the whole display is complete.

Apart from the two sub-matrices 2 and 5 which will be considered in detail next, the various circuit elements of the addressing circuit arrangement can be of any convenient known form. For instance, the counters 8, 9 and 10 and their associated decoders 6, 7 and 3 can be commercially available elements of pre-fabricated form. The character generator 4 can be a commercially available "Read-Only" memory device.

Figure 4:
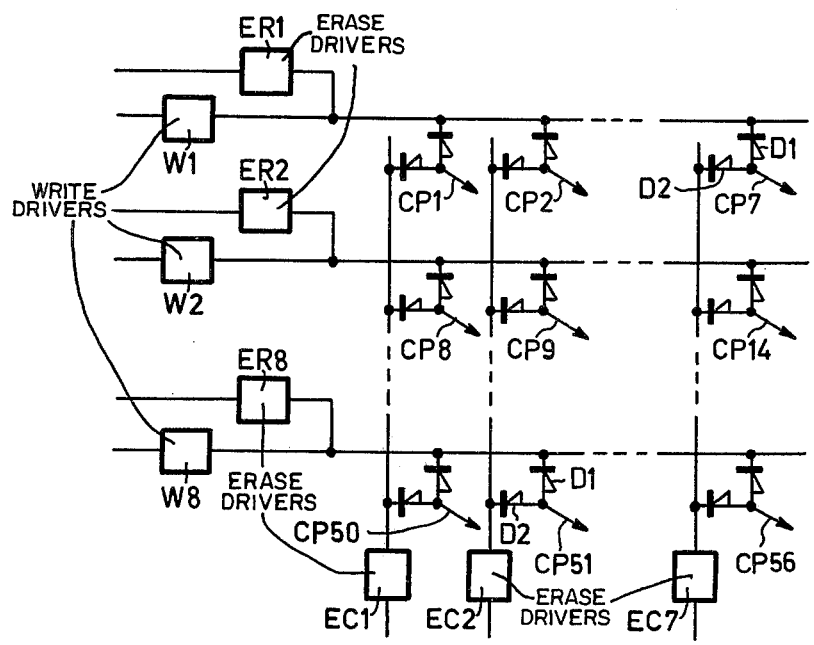
FIG. 4 shows diagrammatically a first sub-matrix of driver circuits for supplying write pulses and erase pulses to the row conductors of the display panel of the display device.

The sub-matrix 2 is organised as shown in FIG. 4 to which reference will now be made. It comprises a first group of eight erase driver circuits ER1, ER2, ... ER8, a second group of 7 erase driver circuits EC1, EC2, ... EC7, and a group of eight write driver circuits W1, W2, ... W8. The first and second groups of erase driver circuits are arranged in an 8×7 matrix to provide 56 cross-point outputs CP1, CP2, ... CP7, CP8, CP9 ... CP14, ... CP51, CP52 ... CP56. The diodes D1 and D2 are provided at each of these cross-point outputs to mutually isolate each cross-point output from the other cross-point outputs in the same row and column. The circuits of the group of eight write driver circuits W1, W2, ... W8 are "paralleled" with the circuits of the first group of eight erase driver circuits ER1, ER2, ... ER8 at the cross-point output rows.

Figure 5:
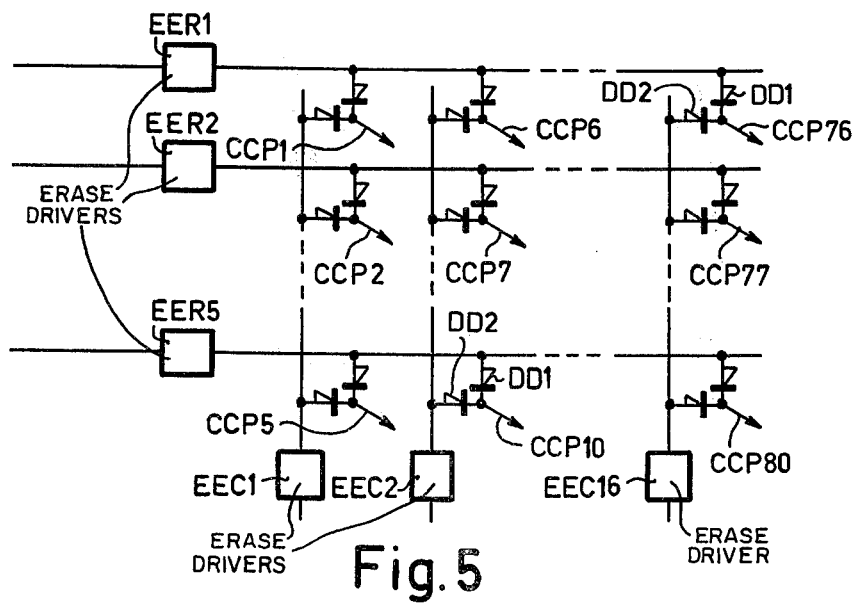
FIG. 5 shows diagrammatically a second sub-matrix of driver circuits for supplying erase pulses tothe column conductors of the display panel of the display device.

The sub-matrix 5 is similarly organised, as shown in FIG. 5, except that it does not include write driver circuits. It simply comprises a third group of five erase driver circuits EER1, EER2, ... EER5 and a fourth group of 16 erase driver circuits EEC1, EEC2, ... EEC16, which are arranged in a 5×6 matrix to provide 80 cross-point outputs, CCP1, CCP2, ... CCP5, CCP6, CCP7, ... CCP10, ... CCP76, CCP77, ... CCP80, at each of which is provided two diodes DD1 and DD2.

Figure 6:
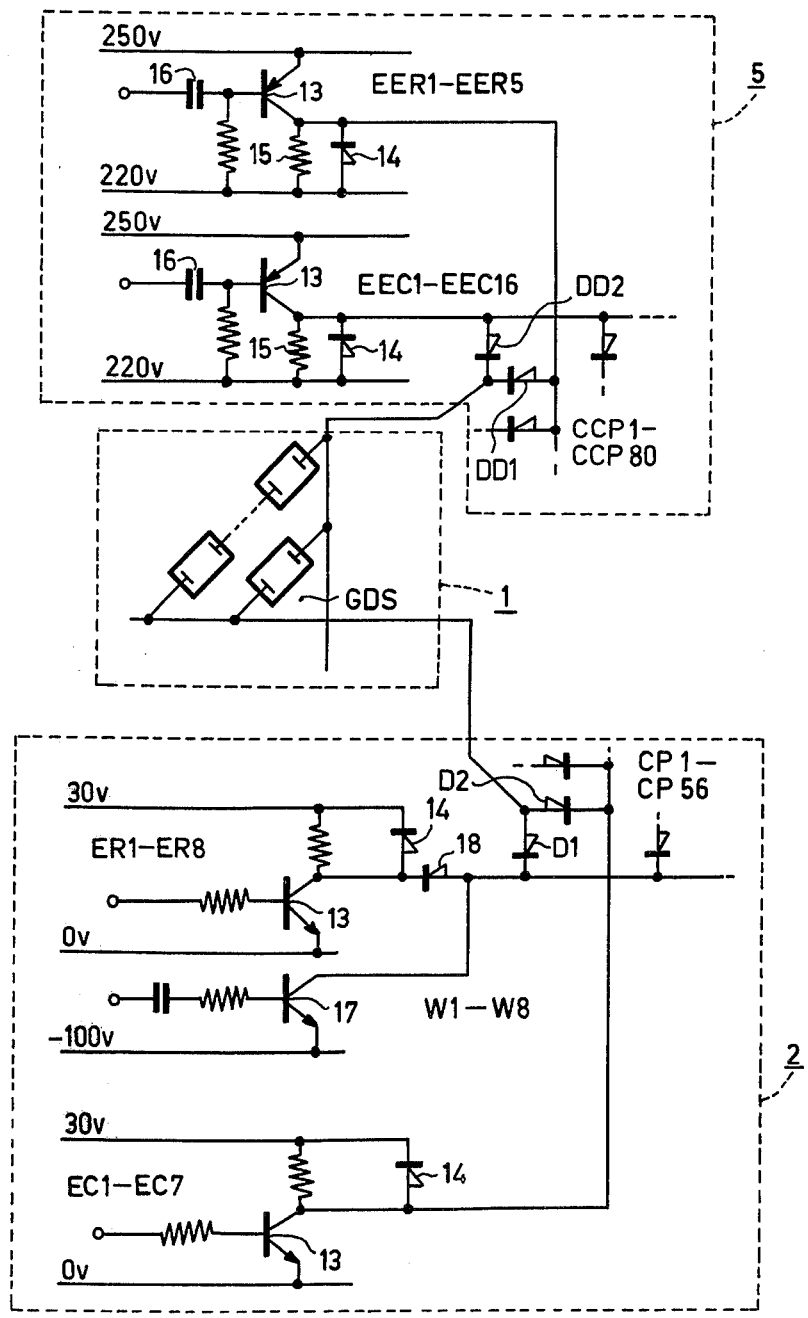
FIG. 6 shows simplified circuit diagrams of write and erase driver circuits for the two sub-matrices, together with their interconnections across a light-emitting element of the display panel.

The simplified circuit diagrams shown in FIG. 6 illustrate the modes of energisation of the display panel 1. Each erase driver circuits of the two groups EER1 ... EER5 and EEC1 ... EEC16 in the sub-matrix 5 comprises a normally conductive PNP transistor 13 connected between a 250v–230v supply. With the transistor conductor a diode 14, connected across a collector resistor 15 for the transistor, is reverse biassed so that approximately 250v is fed to the cross-point outputs CCP1 ... CCP80. While the transistor 15 is rendered non-conductive by a pulse applied via a capacitor 16 to the base from the relevant decoder 6 or 7, the diode 14 becomes forward biassed so that approximately 220v is fed to the cross-point outputs CCP1 ... CCP80. Each of the erase driver circuits of the two groups ER1 ... ER8 and EC1 ... EC7 in the sub-matrix 2 is similarly constituted except that the normally conductive transistor 13 is an NPN transistor and the diode 14 is thus poled in the opposite direction. Also, the transistor 13 is connected between a 30v–0v supply. Thus, approximately 30v is fed to the cross-point outputs CP1 ... CP56 when the transistor 13 is conductive and approximately 0v when this transistor is rendered non-conductive by a pulse applied to its base from the decoder 3 or the character generator 4, as the case may be. Each of the write driver circuits W1 ... W8 comprises a normally non-conductive NPN transistor 17 having its emitter connected to −100v supply. Because the transistors 17 in write driver circuits W1 - W8 have their collectors connected in parallel with the collectors of the transistors 13 in the erase driver circuits ER1 ... ER8, each of these latter circuits includes an isolating diode 18.

In the quiescent condition of the sub-matrices 5 and 2 connections exist across each cell of the display panel 1 for the application of the bias voltage (V$b$) thereto, each of these connections being from the anode of each cell through a diode DD1 and the normally conductive transistor 13 of the relevant erase driver circuit in the sub-matrix 5 to the 250v supply line, and from the cathode of each cell through a diode D1 and the normally conductive transistor 13 of the relevant erase driver circuit in the sub-matrix 2 to the 0v supply line. When block writing of seven cell rows takes place by rendering transistors 17 conductive in the relevant write driver circuit, the cathodes of the cells in the seven cell rows are connected to the −100v supply line. As a result, the voltage acriss these cells exceeds their strike voltage (V$s$), so that they ignite, following which they are held ignited by the bias voltage (V$b$). For the selective erasure of cells to form the characters from the ignited seven cell rows, four of the erase driver circuits, two in each of the sub-matrices 5 and 12, require to be energised for each such cell. For instance, consider the cell GDS, assuming that this cell has been ignited, then in order to switch off this cell, the transistors 13 in both the shown erase driver circuits in the sub-matrix 5 and in both the shown erase driver circuits in the sub-matrix 2 have to be rendered non-conductive so that, on the one hand, the anode of the cell is switched from the 250v supply line to the 220v supply line and on the other hand the cathode of the cell is switched from the 0v supply line to the 30v supply line. When these four erase driver circuits are energised, other cells of the display panel 1 in the same cell row and the same cell column as the cell GDS receive directly one erase pulse (V$w$) from either sub-matrix 5 or the sub-matrix 2 but because of the mutually isolating action of the diode pairs DD1, DD2 and D1, D2, only the cell GDS receives two erase pulses (V$w$).

It has been found that an electrical display device according to the present invention affords a significant cost reduction as compared with equivalent devices because the organisation of the driver circuits into two sub-matrices, which becomes possible by means of the mutually isolated cross-points outputs, enables a minimum of driver circuits to be used.

What we claim is:

1. An electrical display device which comprises a DC gas panel having row conductors and column conductors, an addressing circuit arranged to effect block write/random erase addressing which includes a first sub-matrix of erase driver circuits for supplying erase pulses to the row conductors and a second sub-matrix of erase driver circuits for supplying erase pulses to the column conductors, each of said sub-matrices comprising in respect of each conductor to be energised of the appertaining conductor group (row or column) a cross-point output formed by the interconnection of two unique co-ordinate erase driver circuit outputs, means for providing isolation for the DC gas panel which comprise a pair of diodes at each cross-point output through which the two erase driver circuit outputs are connected respectively to form the cross-point output, said diodes being connected to isolate operationally each cross-point output from the other cross-point outputs of the same sub-matrix, while permitting the application of the appropriate erase and bias voltage amplitudes across the elements of the matrix.

2. A device as claimed in claim 1, wherein one of said first and second sub-matrices includes a single group of write driver circuits which have their outputs paralleled with the outputs of one group of erase driver circuits of the matrix at the cross-point outputs thereof.

3. A device as claimed in claim 2, wherein said single group of write driver circuits is arranged to block write the element rows pertaining to an entire line of characters, and wherein selective erasure of elements in these rows to form characters is effected column-by-column.

4. A device as claimed in claim 1, wherein each erase driver circuit comprises a normally conductive transistor through which a connection is established for applying the bias voltage across the appertaining elements of the matrix, the transistor of each erase driver circuit of the first sub-matrix being connected between first and second voltage levels and the transistor of each erase driver circuit of the second sub-matrix being connected between third and fourth voltage levels, said bias voltage being established by said first and fourth voltage levels when the transistors are conductive and an erase voltage being established by said second and third voltage levels when the transistors are non-conductive.

5. A device as claimed in claim 1, wherein each write driver circuit comprises a normally non-conductive transistor through which a connection is established for applying a strike voltage across the appertaining element row(s) of the matrix when this transistor is rendered conductive, said strike voltage being established by a fifth voltage level and said first voltage level.

6. An electrical display device as claimed claim 1 wherein the two-dimensional matrix of light-emitting elements is a matrix of glow discharge cells.

* * * * *

UNITED STATES PATENT AND TRADEMARK OFFICE
CERTIFICATE OF CORRECTION

PATENT NO. : 4011558
DATED : March 8, 1977
INVENTOR(S) : GRAHAM T. SHARPLESS

It is certified that error appears in the above-identified patent and that said Letters Patent are hereby corrected as shown below:

Column 2, line 28, before "Vw" insert --2--.

Column 6, line 17, "cells" should be --cell--;

line 18, "entinguishing" should be --extinguishing-- line 64, "While" should be --When--.

Column 7, line 34, "acriss" should be --across--.

Signed and Sealed this ninth Day of August 1977

[SEAL]

Attest:

RUTH C. MASON
Attesting Officer

C. MARSHALL DANN
Commissioner of Patents and Trademarks